US012608428B1

(12) United States Patent
Samuel et al.

(10) Patent No.: US 12,608,428 B1
(45) Date of Patent: Apr. 21, 2026

(54) GENERATIVE ARTIFICIAL INTELLIGENCE BASED APPROACH FOR PROCESSING REQUESTS FOR INFORMATION ABOUT ELECTRONIC DOCUMENTS

(71) Applicant: INTUIT INC., Mountain View, CA (US)

(72) Inventors: John Samuel, Banglore (IN); Gokul Elumalai, Bangalore (IN); Sanjay Kumar, Bengaluru (IN); Snehal Shaevya, Bengaluru (IN); Baljinder Singh, Bengaluru (IN); Karthik Nayak, Bengaluru (IN); Srivathsal Venkataramu, Bengaluru (IN); Sandeep Mewara, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/010,803

(22) Filed: Jan. 6, 2025

(51) Int. Cl.
| | |
|---|---|
| *G06F 16/93* | (2019.01) |
| *G06F 16/22* | (2019.01) |
| *G06F 16/9038* | (2019.01) |
| *G06F 40/40* | (2020.01) |

(52) U.S. Cl.
CPC .......... *G06F 16/93* (2019.01); *G06F 16/2237* (2019.01); *G06F 16/9038* (2019.01); *G06F 40/40* (2020.01)

(58) Field of Classification Search
CPC .. G06F 16/93; G06F 16/2237; G06F 16/9038; G06F 40/40

USPC ........................................................ 707/722
See application file for complete search history.

(56) References Cited

U.S. PATENT DOCUMENTS

2023/0099588 A1 * 3/2023 Zhou ................. G06F 16/90335
707/765
2025/0094787 A1 * 3/2025 Nia ......................... G06N 20/00

FOREIGN PATENT DOCUMENTS

CN 101523338 A * 9/2009 ........... G06F 16/248

* cited by examiner

*Primary Examiner* — Kuen S Lu
(74) *Attorney, Agent, or Firm* — Patterson + Sheridan, LLP

(57) ABSTRACT

A method for automatically generating a response to a current request for information about an electronic document associated with a particular domain of knowledge includes interpreting, using a first language processing machine learning model, the electronic document to obtain interpreted data. The method includes selecting, based on the current request, a subset of feedback data included in a first knowledge store and selecting, based on the current request, a subset of domain data stored in a second knowledge store. The method includes injecting a prompt into the first language processing machine learning model or a second language processing machine learning model based on the current request, the subset of feedback data, the subset of domain data, and the interpreted data. The method includes generating, by the first language processing machine learning model or the second language processing machine learning model, the response to the request based on the injecting.

20 Claims, 8 Drawing Sheets

400
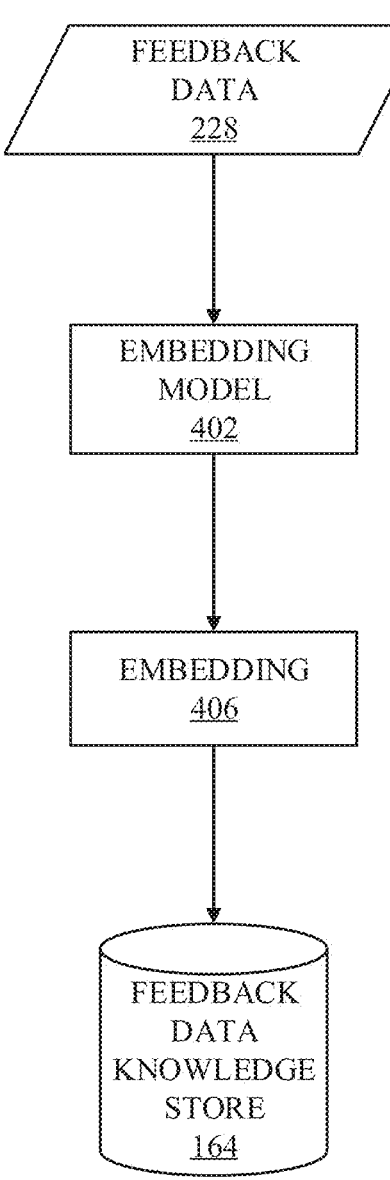
FEEDBACK
DATA
228
EMBEDDING
MODEL
402
EMBEDDING
406
FEEDBACK
DATA
KNOWLEDGE
STORE
164
FIG. 4

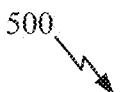
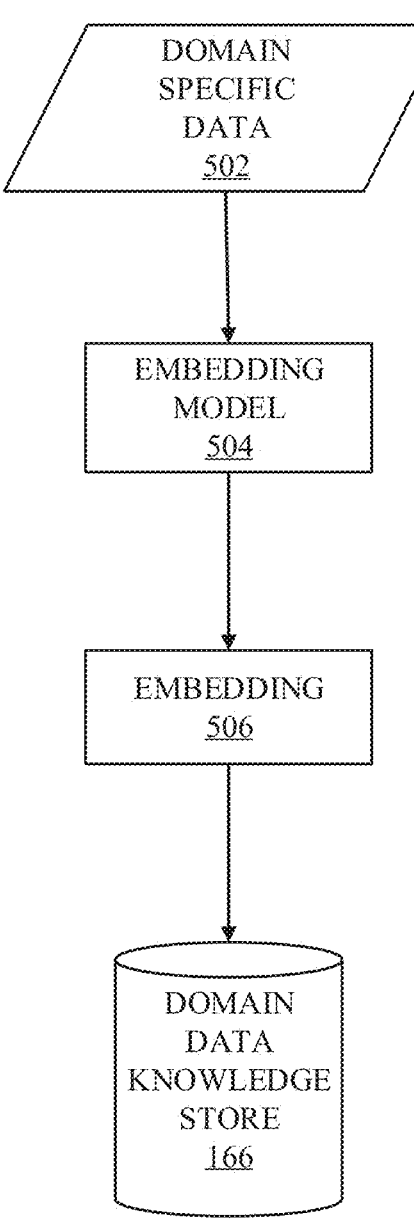
FIG. 5

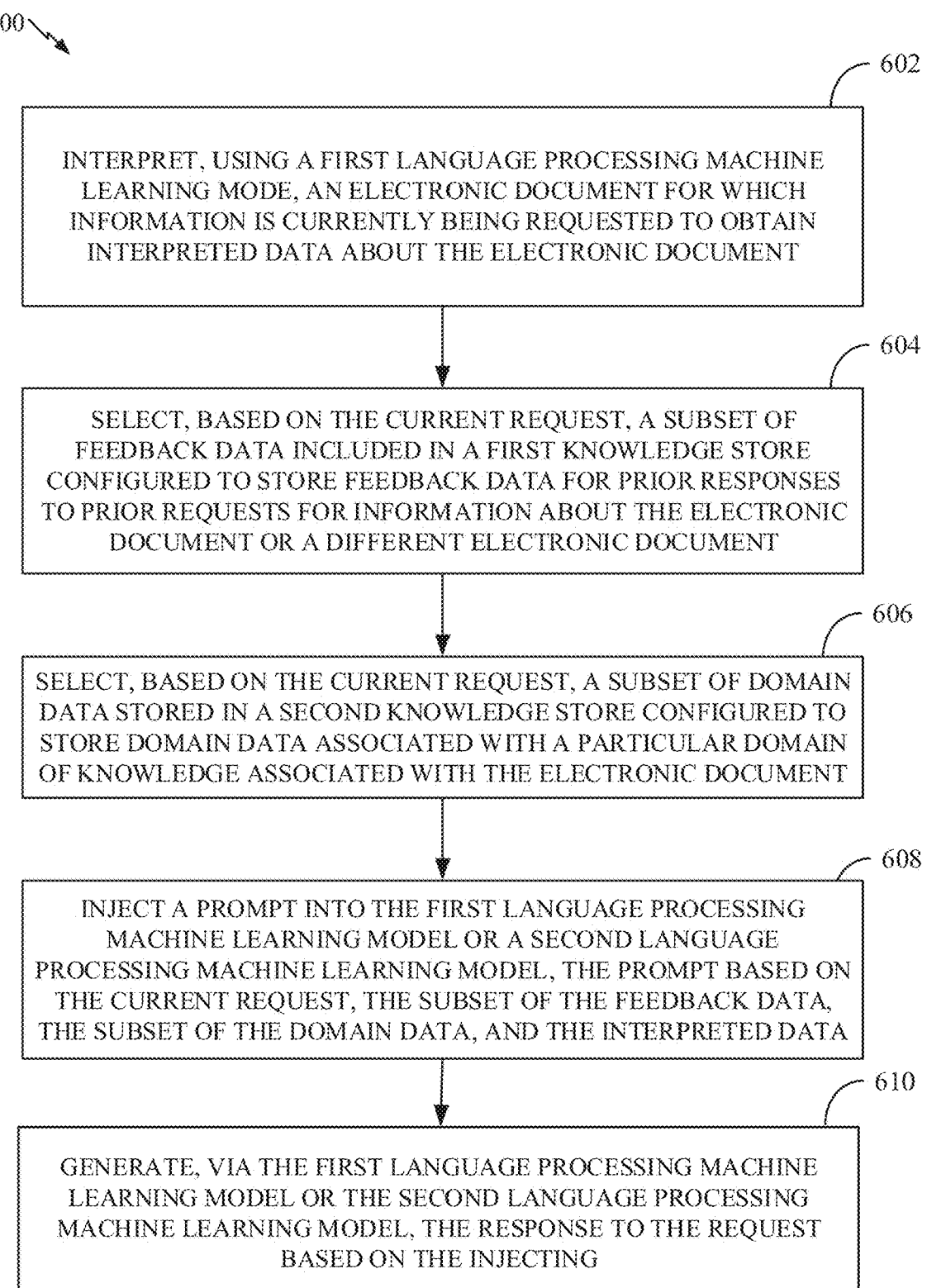

600

602

INTERPRET, USING A FIRST LANGUAGE PROCESSING MACHINE LEARNING MODE, AN ELECTRONIC DOCUMENT FOR WHICH INFORMATION IS CURRENTLY BEING REQUESTED TO OBTAIN INTERPRETED DATA ABOUT THE ELECTRONIC DOCUMENT

604

SELECT, BASED ON THE CURRENT REQUEST, A SUBSET OF FEEDBACK DATA INCLUDED IN A FIRST KNOWLEDGE STORE CONFIGURED TO STORE FEEDBACK DATA FOR PRIOR RESPONSES TO PRIOR REQUESTS FOR INFORMATION ABOUT THE ELECTRONIC DOCUMENT OR A DIFFERENT ELECTRONIC DOCUMENT

606

SELECT, BASED ON THE CURRENT REQUEST, A SUBSET OF DOMAIN DATA STORED IN A SECOND KNOWLEDGE STORE CONFIGURED TO STORE DOMAIN DATA ASSOCIATED WITH A PARTICULAR DOMAIN OF KNOWLEDGE ASSOCIATED WITH THE ELECTRONIC DOCUMENT

608

INJECT A PROMPT INTO THE FIRST LANGUAGE PROCESSING MACHINE LEARNING MODEL OR A SECOND LANGUAGE PROCESSING MACHINE LEARNING MODEL, THE PROMPT BASED ON THE CURRENT REQUEST, THE SUBSET OF THE FEEDBACK DATA, THE SUBSET OF THE DOMAIN DATA, AND THE INTERPRETED DATA

610

GENERATE, VIA THE FIRST LANGUAGE PROCESSING MACHINE LEARNING MODEL OR THE SECOND LANGUAGE PROCESSING MACHINE LEARNING MODEL, THE RESPONSE TO THE REQUEST BASED ON THE INJECTING

FIG. 6

GENERATIVE ARTIFICIAL INTELLIGENCE BASED APPROACH FOR PROCESSING REQUESTS FOR INFORMATION ABOUT ELECTRONIC DOCUMENTS

INTRODUCTION

Aspects of the present disclosure relate to software applications used to prepare electronic documents within a particular domain of knowledge. More specifically, the present disclosure relates to a generative artificial intelligence based approach for automatically processing requests for information about the electronic documents.

BACKGROUND

Every year millions of people, businesses, and organizations around the world utilize software applications to assist with countless aspects of life. For example, software applications may be utilized to prepare electronic documents within a particular domain of knowledge (e.g., financial domain).

Software applications used to prepare electronic documents typically include a user interface that users may interact with to perform various tasks, such as switch from a first electronic document prepared (or being prepared) for a first individual to a second electronic document prepared (or being prepared) for a second individual. For example, a user may switch from the first electronic document to the second electronic document to check on the status of the second electronic document or to obtain information included in the second electronic document. To do so, the user typically navigates through the multiple windows of the user interface, with the user providing input at each of the windows. This process of displaying multiple windows within the user interface and processing user-input provided at each of the windows is time-consuming and represents an inefficient utilization of computing resources. Furthermore, the process is error-prone as the user must not only navigate to the correct electronic document but also extract (e.g., copy or write-down) the correct information therefrom.

Thus, there is a need in the art for techniques for automatically handling requests for information about electronic documents that are prepared using software applications.

BRIEF SUMMARY

Certain embodiments provide a method for automatically responding to request for information about electronic documents prepared using a software application. The method typically includes: interpreting, using a first language processing machine learning model, the electronic document to obtain interpreted data about the electronic document; selecting, based on the current request, a subset of feedback data included in a first knowledge store configured to store feedback data for prior responses to prior requests for information about the electronic document or a different electronic document; selecting, based on the current request, a subset of domain data stored in a second knowledge store configured to store domain data associated with the particular domain of knowledge; injecting a prompt into the first language processing machine learning model or a second language processing machine learning model, the prompt based on the current request, the subset of feedback data, the subset of domain data, and the interpreted data; and generating, via the first language processing machine learning model or the second language processing machine learning model, the response to the current request based on the injecting.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts feedback data for a response automatically generated in response to a request for information about an electronic document being converted to an embedding and stored in a feedback data knowledge store according to some embodiments of the present disclosure.

FIG. 5 depicts domain data for a particular domain of knowledge in which a software application is used to prepare electronic documents being converted to an embedding and stored in a domain data knowledge store according to some embodiments of the present disclosure.

FIG. 6 depicts a flow diagram of a method for automatically generating a response to a request for information about an electronic document prepared using a software application according to some embodiments of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
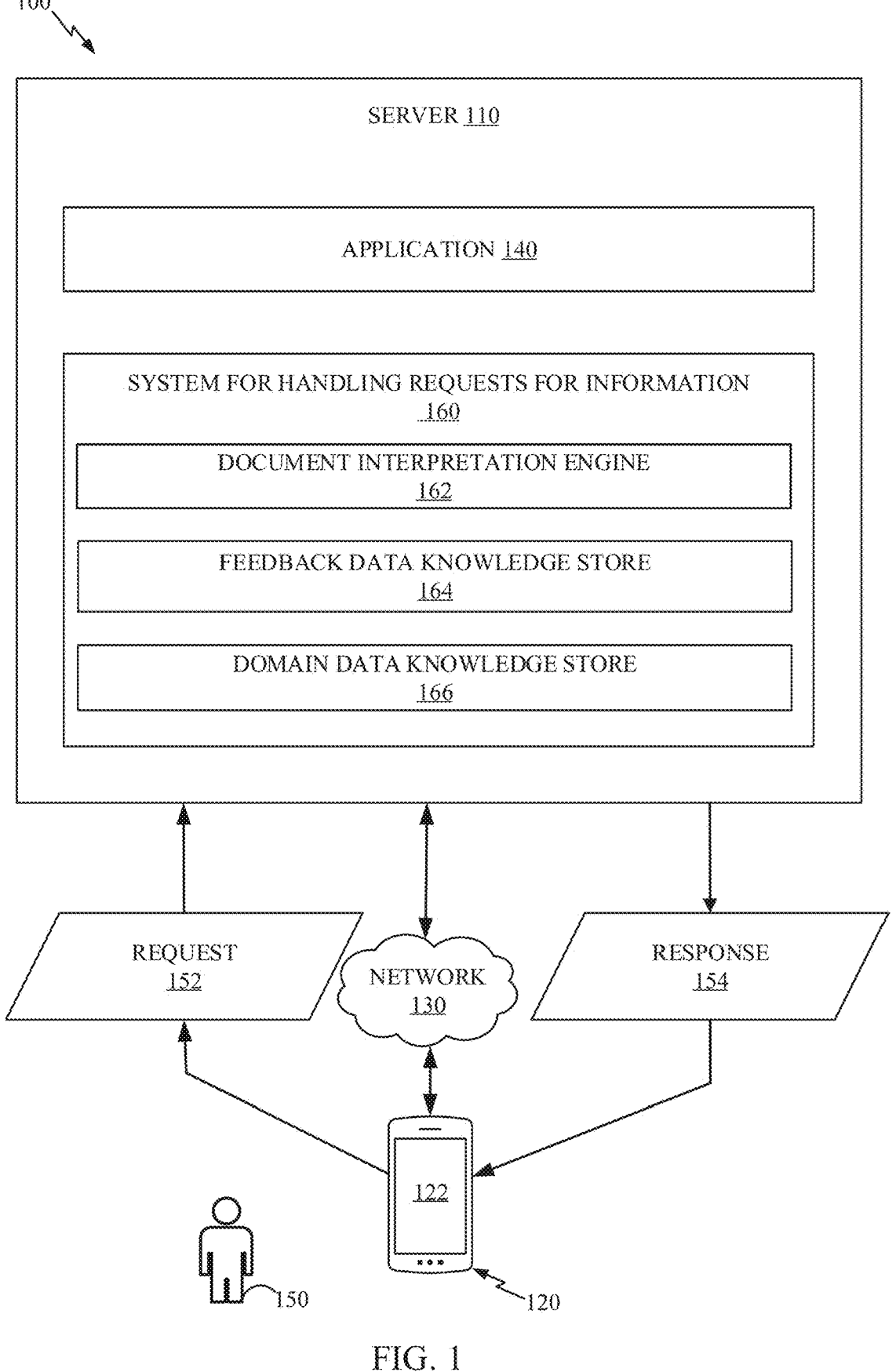
FIG. 1 depicts a system for analyzing electronic documents using generative artificial intelligence according to some embodiments of the present disclosure.

Techniques described herein enable automatic generation of responses to requests for information about electronic documents, such as documents associated with a particular domain of knowledge and prepared using a software application. To accomplish such automated generation, the disclosed techniques may include using generative artificial intelligence models, such as language processing machine learning models, to interpret an electronic document. For example, the generative artificial intelligence models may obtain information about the electronic document, such as whether the electronic document is complete (e.g., no fields missing information) or incomplete (e.g., fields missing information) and/or obtain information included in the electronic document that is relevant to responding to the request.

The automated generation may be enhanced by searching for feedback data (e.g., provided by users) relating to prior responses that were automatically generated for prior requests for information about the electronic document or another electronic document prepared using the software application. Domain data (e.g., forms and/or rules) associated with the particular domain of knowledge may also be retrieved for use in automated generation. Thus, the disclosed techniques may obtain relevant feedback data and relevant domain data that can be included in a prompt provided to a generative artificial intelligence model that will, based on the prompt, automatically generate the response to the request. In this manner, the accuracy of the response generated by the generative artificial intelligence model may be improved compared to conventional approaches, because the generative artificial intelligence model is prompted to consider prior feedback on similar responses generated for similar requests as well as the relevant domain data.

In some embodiments, the feedback data and the domain data may be stored as embeddings (e.g., in one or more knowledge stores). Accordingly, such data may be retrieved in a more efficient manner (e.g., using an embedding search) compared to conventional techniques in which such data (e.g., feedback data and/or domain data) is not stored in the form of embeddings.

Example aspects of the present disclosure provide numerous technical effects and benefits. For instance, by using generative artificial intelligence machine learning models to automatically generate a response to a request for information about an electronic document prepared using a software application, the disclosed techniques avoid the inefficient utilization of computing resources that is associated with conventional approaches in which users navigate through multiple windows of a user interface to access the document and manually obtain the requested information. Furthermore, by supplementing the prompt for the generative artificial intelligence model with relevant feedback data and relevant domain data, the accuracy of the response generated by the generative artificial intelligence model may be improved. Still further, by storing feedback data for the generated response, the feedback data may be included as context information in subsequent prompts for the same request or similar requests and, as a result, provide for training, fine-tuning, and/or otherwise ongoing improvement of the functioning of the generative artificial intelligence model through the collected feedback data. In some embodiments, "training" may refer to instruction training, instruction fine-tuning, or prompt-based training in which feedback data is provided as context data or as a few-shot learning example with a prompt to a language processing machine learning model to instruct the model to generate a response to the prompt in a manner that is informed by the feedback data.

Example Computing Environment for Automatically Handling Requests for Information about Electronic Documents FIG. 1 depicts a computing environment 100 for automatically handling requests for information about electronic documents within a particular domain of knowledge according to some embodiments of the present disclosure.

The computing environment 100 includes a server 110 and a client device 120 connected over a network 130. The network 130 may be representative of any type of connection over which data may be transmitted, such as a wide area network (WAN), local area network (LAN), cellular network and/or the like.

The server 110 generally includes a computing device, such as a server computer. The server 110 includes a software application 140, which generally represents a computing application that a user interacts with over the network 130 via a user interface 122 displayed (e.g., on a display screen) of the client device 120. The software application 140 may be used to prepare electronic documents within a particular domain of knowledge. For example, in some embodiments, the software application 140 may be used to prepare electronic documents, such as tax returns, within the financial domain.

In some embodiments, each of the electronic documents prepared using the software application 140 includes a plurality of fields. Furthermore, each of the plurality of fields within a respective electronic document may be populated (e.g., filled) with information that is unique to an entity (e.g., individual, corporation, etc.) for whom the respective electronic document is being prepared. In this manner, each of the electronic documents prepared using the software application 140 may be associated with a different entity.

In some embodiments, a user 150 may interact with the user interface 122 displayed on the client device 120 to submit a request 172 for information about an electronic document prepared using the software application 140. For example, the request 172 may be for a summary of the electronic document. As another example, the request 172 may be for a specific detail about the electronic document, such as a request for information included in a particular field of the electronic document.

The server 110 may include a system 160 for automatically handling requests for information about electronic documents prepared using the software application 140. As illustrated, the system 160 may include a document interpretation engine 162, a feedback data knowledge store 164, a domain data knowledge store 166, and one or more language processing machine learning models 168. Details of these components of the system 160 will be discussed in more detail with reference to FIGS. 2A and 2B.

The system 160 may generally be configured to automatically generate a response 174 to the request 172 submitted by the user 150. In some embodiments, the response 174 may be displayed within the user interface 122 for viewing by the user 150. Furthermore, in some embodiments, the user 150 may provide feedback data regarding the response 174 and the feedback data may be used to train (or re-train) the system 160. In this manner, the accuracy of responses automatically generated by the system 160 may improve (e.g., be more accurate) over time based on the feedback data.

By automatically generating the response 174 to the request 172 submitted by the user 150, the disclosed system 160 improves upon conventional techniques for obtaining requested information about a particular electronic document, such as by the user 150 navigating through multiple windows of the user interface 122 to manually obtain the requested information. In this manner, the disclosed system 160 improves the function of the computing environment 100, specifically the server 110 and the client device 120 thereof, because computing resources are not wasted displaying the multiple windows of the user interface 122 and processing user input (e.g., provided by the user 150) at each of the multiple windows according to conventional techniques.

Figure 2A:
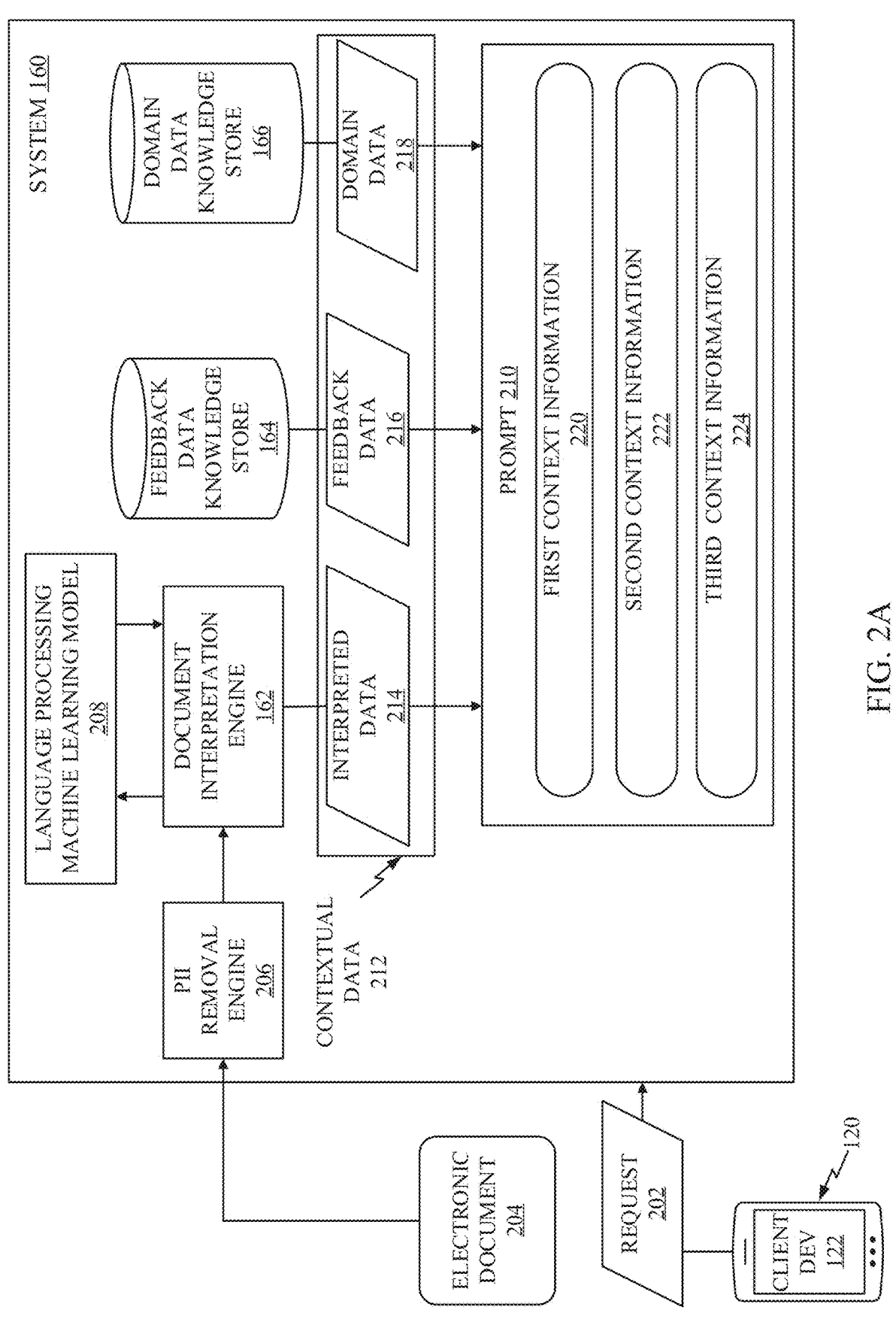
FIG. 2A and FIG. 2B depicts a system for automatically generating a response to a request for information about an electronic document prepared using a software application according to some embodiments of the present disclosure.
Figure 2B:
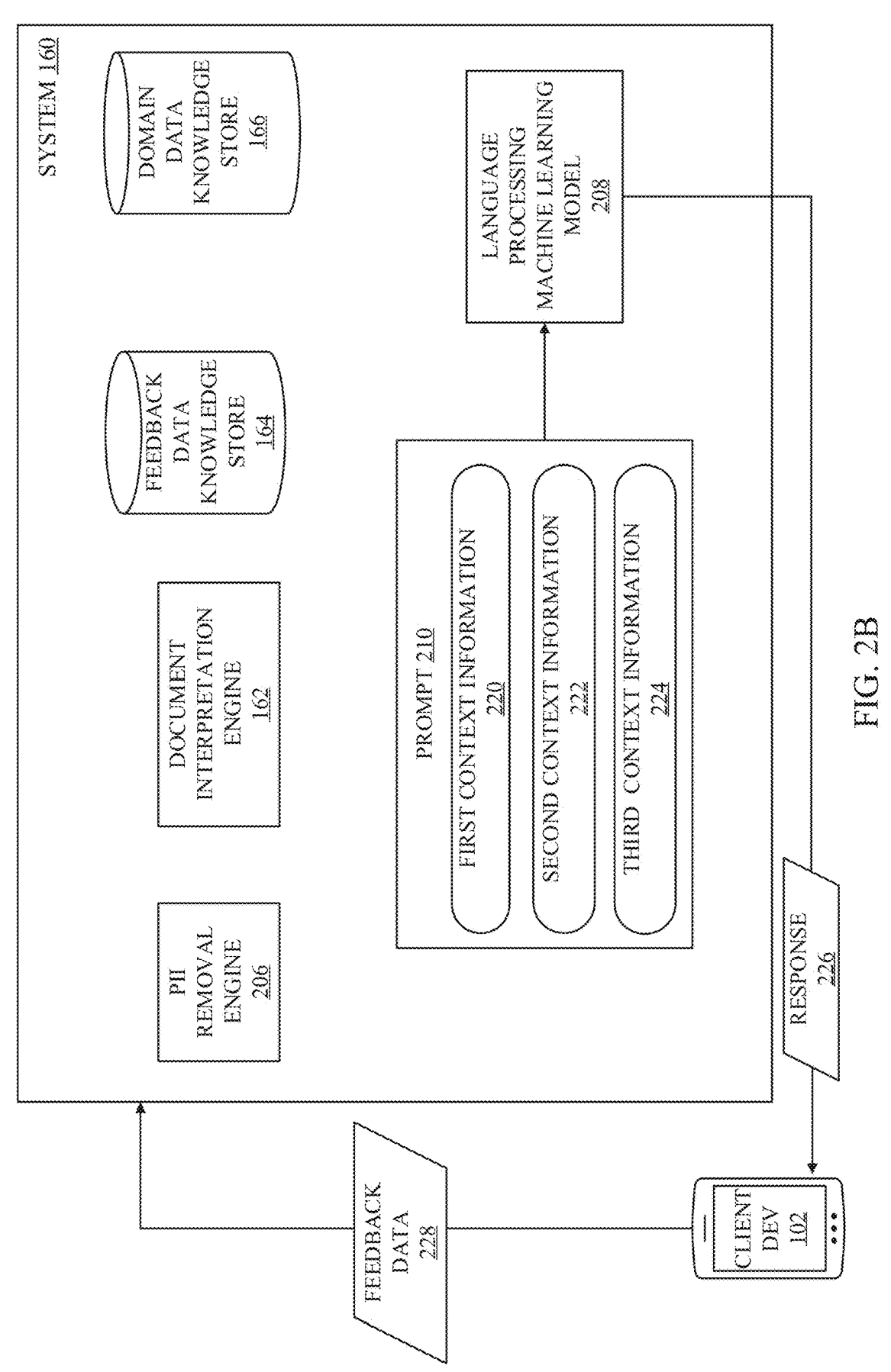

Example Data Flow for a System for Handling Requests for Information about Electronic Documents Prepared Using a Software Application FIGS. 2A and 2B depicts a configuration of the system 160 for handling requests for information about electronic documents prepared using a software application according to some embodiments of the present disclosure. For simplicity, operation of the system 160 will be discussed with reference to a request 202 for information included in an electronic document 204 prepared using a software application, such as the software application 140 discussed above with reference to FIG. 1.

In some embodiments, the electronic document 204 may be stored as an object having a particular format. For example, the electronic document 204 may include a structure object having the JavaScript Object Notation (JSON) format. In alternative embodiments, the electronic document 204 may be stored as a structured object having a different format.

In some embodiments, the system 200 may include a personally identifiable information (PII) engine 206 configured to determine whether the electronic document 204 includes PII. For example, the PII engine 206 may be configured to check information included in each of the plurality of fields in the electronic document 204. In some embodiments, the PII engine 206 may be configured to remove the PII from the electronic document 204. In alternative embodiments, the PII engine 206 may be configured to anonymize the PII. For example, the PII engine 206 may be configured to replace the PII with generic information.

The document interpretation engine 162 may receive the electronic document 204 via the PII engine 206. In this manner, the document interpretation engine 162 may receive the electronic document 204 after the PII included in the electronic document 204 has removed or anonymized. The document interpretation engine 162 may be configured to interpret the electronic document 204 based, at least in part, on the request 202.

In some embodiments, the document interpretation engine 162 may use a language processing machine learning model 208 to interpret the electronic document 204 based on the request 202. For instance, the request 202 may include natural language text that may indicate which field(s) of the electronic document 204 will be relevant to generate a response to the request 202. As an example, the electronic document 204 may be a financial document (e.g., tax return) for a given individual, and the request 202 submitted by a user of the software application may read, "What is my wage?" And, for this particular request 202, the language processing machine learning model 208 may be configured to determine which field(s) of the financial document are relevant to automatically generate a response (e.g. the wage) to the request 202.

In some embodiments, the language processing machine learning model 208 may include a transformer-based model. Examples of transformer-based models may include, without limitation, a bidirectional encoder representation from transformers (BERT) or a generative pre-trained transformer (GPT). By using the language processing machine learning model 208, the document interpretation engine 162 may accurately interpret the electronic document 204 and determine which field(s) of the electronic document 204 are relevant based on the request 202.

In some embodiments, training of the language processing machine learning model 208 involves a supervised learning process that involves providing training inputs to the language processing machine learning model 208. The language processing machine learning model 208 can process the training inputs and determine outputs based on the training inputs. The outputs are compared to known labels associated with the training inputs (e.g., labels manually applied to training data by experts or otherwise known to be associated with the training inputs) to determine the accuracy of the language processing machine learning model 208, and parameters of the language processing machine learning model 208 are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the outputs produced by the language processing machine learning model 208 based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for the model, such as based on validation data and test data, as is known in the art.

In some embodiments, language processing machine learning model 208 is trained on a large corpus of natural language text to identify patterns in text and utilize such patterns to generate natural language outputs.

The feedback data knowledge store 164 may be configured to store feedback data for prior responses returned by the system 160 in response to prior requests for information about electronic documents prepared using the software application (e.g., the software application 140 in FIG. 1). In some embodiments, the feedback data may include corrections to the format of a prior response that the system 160 automatically generated for a prior request. For example, the prior response that the system 160 automatically generated for the prior request may include a numerical value having an incorrect format (e.g., decimal place in wrong location), and the feedback data for the prior response may include the correct format (e.g., correct location for decimal place) for the numerical value.

In some embodiments, the feedback data stored in the feedback data knowledge store 164 may be related to the substance of a prior response that the system 160 automatically generated for a prior request. For example, the feedback data may indicate whether a user found the prior response helpful based on what information the user requested. In some embodiments, the feedback data may indicate that the user found the prior response unhelpful if a user that submitted the prior request ignored (e.g., did not read) the prior response that the system 160 automatically generate for the prior request. Conversely, the feedback data may indicate that the user found the prior response helpful if the user engaged (e.g., read) the prior response.

The domain data knowledge store 166 be configured to store documents (e.g., forms) that are relevant to the particular domain of knowledge in which the software application is configured to prepare electronic documents, such as the electronic document 204 for which information is being requested. The domain data knowledge store 166 may also be configured to store rules (e.g., statutes) that the software application must adhere to when a user is utilizing the software application to prepare electronic documents for one or more entities.

In some embodiments, the system 200 may generate a prompt 210 for the language processing machine learning model 208 (or a different language processing machine learning model) based on the request 202 and contextual data 212. For instance, in some embodiments, the prompt 210 may be a template that is populated with information based on the request 202 and the contextual data 212.

In some embodiments, the contextual data 212 may include first data 214 (e.g., labeled interpreted data) obtained from the document interpretation engine 162, second data 216 (e.g., labeled feedback data) obtained from the feedback data knowledge store 164, and third data 218 (e.g., labeled domain data) obtained from the domain data knowledge store 166.

The prompt 210 may include first context information 220 that is based on the first data 214 obtained from the document interpretation engine 162. For example, the first context information 220 may include information included in the electronic document 204. More specifically, the first context information 220 may include information included in the electronic document 204 and determined to be relevant to the request 202. Stated another way, the first context information 220 may include information in the electronic document 204 that may be useful for the system 160 to generate a response to the request 202.

The prompt 210 may include second context information 222 that is based on the second data 216 obtained from the feedback data knowledge store 164. For example, the second context information 222 may include feedback included in the feedback data knowledge store 164 and determined to be relevant to the request 202. Stated another way, the second context information 222 may include feedback that may be useful for the system 160 to generate a response to the request.

The prompt 210 may include third context information 224 that is based on the third data 218 obtained from the domain data knowledge store 166. For example, the third context information 224 may include domain data (e.g., forms and/or rules) stored in the domain data knowledge store and determined to be relevant to the request 202. Stated another way, the second context information 222 may include domain data that may be useful for the system 160 to generate a response to the request.

In some embodiments, the prompt 210 may be provided as an input to the language processing machine learning model 208. In alternative embodiments, the prompt 210 may be provided as an input to a different language processing machine learning model. The language processing machine learning model 208 (or a different language processing machine learning model) may be configured to automatically generate a response 226 to the request 202 for information about the electronic document 204. By including the first context information 220 (e.g., based on the first data 214 obtained from the document interpretation engine 162), the second context information 222 (e.g., based on the second data 216 obtained from the feedback data knowledge store 164), and the third context information 224 (e.g., based on the third data 218 obtained from the domain data knowledge store 166), the accuracy of the response 226 that the language processing machine learning model 208 automatically generates for the request 202 may be improved.

In some embodiments, the user (e.g., the user 150 in FIG. 1) may submit feedback data 228 based on the response 226 that the system 160 automatically generated in response to the request 202 for information about the electronic document 204. In some embodiments, the feedback data 228 may be related to the format of the response 226. Alternatively, or additionally, the feedback data 228 may be related to the substance of the response 226. For instance, the feedback data 228 may indicate whether the user found the response

226 helpful (that is, whether the response 226 answered a query included in the request 202 submitted by the user).

In some embodiments, the feedback data 228 may be stored in the feedback data knowledge store 164. In this manner, the next time the system 160 receives the request 202 (or a similar request) the feedback data 228 may be included in the prompt 210, specifically in the second context information 222 thereof. By including the feedback data 228 in the prompt 210 for the subsequent instance of the request 202 (or a similar request), the language processing machine learning model 208 (or a different language processing machine learning model) may learn from the feedback data 228 and provide an improved response for the subsequent instance of the request 202 (or a similar request). Thus, the language processing machine learning model 208 may be trained (or re-trained) based on the feedback data 228 generated by the user each time the language processing machine learning model 208 generates a response each time a user requests information about an electronic document prepared using the software application (e.g., the software application in FIG. 1).

In some embodiments, a request submitted to the system 160 may be related to comparing two different electronic documents for a given entity (e.g., individual, business). For example, the request may be to compare a first financial document (e.g., tax return) prepared for the entity for the current fiscal year to a second financial document (e.g., also a tax return) prepared for the entity for a prior fiscal year (e.g., the fiscal year immediately preceding the current fiscal year). It should be appreciated that the system 160 may operate in the same manner as discussed above to automatically generate a response to the request to compare the two different electronic documents.

Example PII Removal Engine

Figure 3:
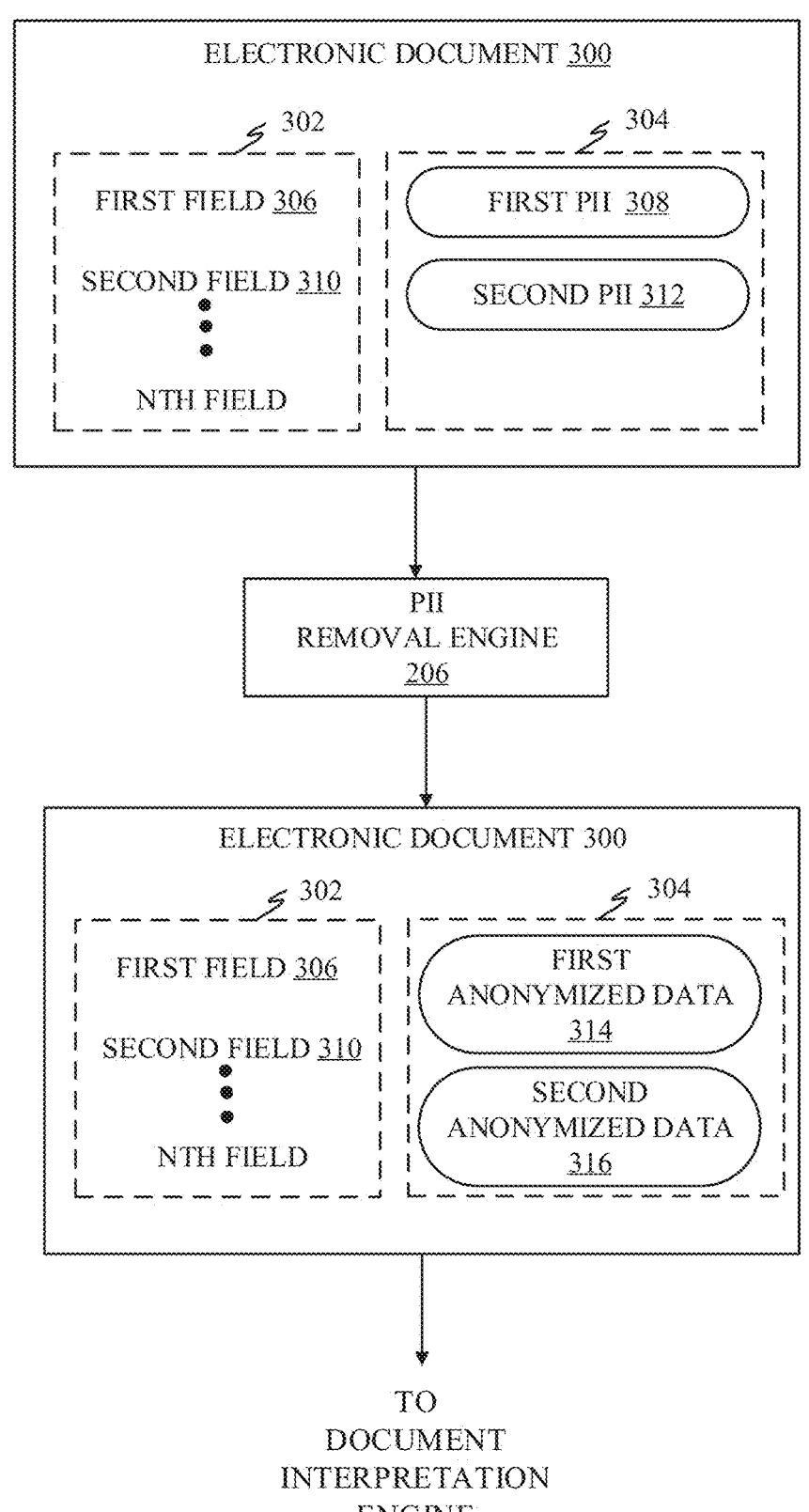
FIG. 3 depicts a personally identifiable information engine replacing personally identifiable information in a document with anonymized information according to some embodiments of the present disclosure.

FIG. 3 depicts PII in an electronic document 300 being anonymized according to some embodiments of the present disclosure.

The electronic document 300 may include a plurality of fields 302 and a plurality of information 304. As an example, a first field 306 of the plurality of fields 302 may be populated with first PII 308. Likewise, a second field 310 of the plurality of fields 302 may be populated with second PII 312. Examples of the first PII 308 and the second PII 312 may include, without limitation, a name, a date of birth, a social security number, a cellphone number, or any other suitable type of information that may personally identify the entity for whom the electronic document 300 was prepared using a software application, such as the software application discussed above with reference to FIG. 1.

The electronic document 300 may be provided as an input to the PII removal engine 206. The PII removal engine 206 may be configured to remove the PII from the electronic document. For instance, the PII removal engine 206 may be configured to remove the first PII 308 from the first field 306 of the electronic document 300. Additionally, the PII removal engine 206 may be configured to remove the second PII from the second field 310 of the electronic document 300.

In some embodiments, the PII removal engine 206 may be configured to anonymize the PII (e.g., the first PII 308 and the second PII 312) in the electronic document 300. For instance, the PII removal engine 206 may be configured to replace the first PII 308 with first anonymized data 314 and to replace the second PII 312 with second anonymized data 316. It should be appreciated that the first anonymized data 314 and the second anonymized data 316 are generic such that the identity of the entity (e.g., person, business, etc.) for whom the electronic document 300 was prepared cannot be determined.

Example Process for Storing Feedback Data for an Automatically Generated Response to a Request for Information about an Electronic Document FIG. 4 depicts a process 400 for storing feedback data for an automatically generated response to a request for information about an electronic document according to some embodiments of the present disclosure. For simplicity, the process 400 will be discussed with reference to feedback data 228 discussed above in FIG. 2B.

In some embodiments, the feedback data 228 may include natural language text indicative of user feedback on a response (that is, the response 226 in FIG. 2B) automatically generated in response to a request (that is, the request 202 in FIG. 2A) for information about an electronic document (that is, the electronic document 204 in FIG. 2A) the user submitted. In some embodiments, the natural language text may be manually generated by the user. For example, the user may interact with the user interface (e.g., the user interface 122 in FIG. 1) on the client device (e.g., the client device 120 in FIG. 1) to provide the user feedback. In alternative embodiments, the natural language text may be automatically generated based on actions of the user with respect to the response to the request for information about the electronic document. For instance, natural language text indicating negative user feedback may be automatically generated if the user does not engage (e.g., ignores) the response. Conversely, natural language text indicating positive user feedback may be automatically generated if the user does engage (e.g., reads) the response. In this manner, user feedback regarding the response can be obtained even when the user does not provide explicit feedback on the response.

As illustrated, the process 400 may include providing the feedback data 228 to an embedding model 402 configured to convert the feedback data 228 into an embedding 404. An embedding generally refers to a vector representation of the feedback data 228 in n-dimensional space such that semantically similar text data (e.g., feedback data) is represented by vectors that are close to one another in the n-dimensional space. In this manner, feedback data and/or other items (e.g., requests) having embeddings that are close to one another in the n-dimensional space may be considered similar to one another. In one example, embedding model 402 comprises a Bidirectional Encoder Representations from Transformer (BERT) model, which involves the use of masked language modeling to determine embeddings. In a particular example, embedding model 402 comprises a Sentence-BERT model. In other embodiments, embedding model 402 may involve embedding techniques such as Word2Vec and GloVe embeddings. These are included as examples, and other techniques for generating embeddings are possible.

The process 400 may include storing the embedding 404 in the feedback data knowledge store 164. In this manner, the feedback data knowledge store 164 may be considered a vector store for embeddings for the feedback data collected for responses the system (e.g., system 160 in FIGS. 2A and 2B) automatically generates for requests for information about electronic documents prepared using the software application.

By storing the feedback data 228 as embeddings, the system (e.g., system 160 in FIGS. 2A and 2B) can more efficiently search for (e.g., using cosine similarity, Euclidean distance, and/or the like) and identify feedback data that is relevant to generating a response to a particular request for information about an electronic document prepared using the software application. For instance, an embedding of a request may be compared to embeddings of feedback data 228 in knowledge store 164 using a vector similarity determination technique in order to identify particular feedback data that is relevant to that request (e.g., for which a similarity measure with respect to the request exceeds a threshold). Furthermore, by including context information regarding the relevant feedback data in the prompt (e.g., the prompt 210 in FIGS. 2A and 2B) for the language processing model (e.g., language processing model 208 in FIGS. 2A and 2B), the accuracy of the response generated by the language processing machine learning model can be improved, because the language processing machine learning model is instructed (e.g., by the prompt) to consider the relevant feedback data when generating the response.

Example Process for Storing Domain Data for a Domain of Knowledge

FIG. 5 depicts a process 500 for storing domain data for a domain of knowledge in which electronic documents are prepared using a software application according to some embodiments of the present disclosure.

In some embodiments, domain data 502 may include forms and/or rules included in the domain of knowledge and used by the software application to prepare the electronic documents. Furthermore, in some embodiments, the domain data 502 (e.g., forms and/or rules) may be provided as an input to an embedding model 504 to convert the domain data 502 into an embedding 506. An embedding generally refers to a vector representation of the domain data 502 in n-dimensional space such that similar text data (e.g., similar domain data, such as similar rules and/or similar forms) is represented by vectors that are close to one another in the n-dimensional space. In this manner, domain data and/or other items having embeddings that are close to one another in the n-dimensional space may be considered similar to one another. In one example, embedding model 504 comprises a Bidirectional Encoder Representations from Transformer (BERT) model, which involves the use of masked language modeling to determine embeddings. In a particular example, embedding model 504 comprises a Sentence-BERT model. In other embodiments, embedding model 504 may involve embedding techniques such as Word2Vec and GloVe embeddings. These are included as examples, and other techniques for generating embeddings are possible. Embedding model 504 may be the same as or different than embedding model 402 of FIG. 4.

The process 500 may include storing the embedding 506 in the domain data knowledge store 166. In this manner, the domain data knowledge store 166 may be considered a vector store for embeddings for the domain data.

By storing the domain data 502 as embeddings, the system (e.g., system 160 in FIGS. 2A and 2B) can more efficiently search for (e.g., using cosine similarity, Euclidean distance, and/or the like) and identify domain data that is relevant to generating a response to a particular request for information about an electronic document prepared using the software application. For instance, an embedding of a request may be compared to embeddings of domain data 502 in knowledge store 166 using a vector similarity determination technique in order to identify particular domain data that is relevant to that request (e.g., for which a similarity measure with respect to the request exceeds a threshold). Furthermore, by including context information regarding the relevant domain data in the prompt (e.g., the prompt 210 in FIGS. 2A and 2B) for the language processing model (e.g., language processing model 208 in FIGS. 2A and 2B), the accuracy of the response generated by the language processing machine learning model can be improved, because the language processing machine learning model is instructed (e.g., by the prompt) to consider the relevant domain data when generating the response.

Example Process for Automatically Generating Responses to Requests for Information about Electronic Documents Prepared Using a Software Application FIG. 6 is a flow diagram of example operations 600 for automatically generating a response to requests for information about electronic documents prepared using a software application according to some embodiments of the present disclosure. The operations 600 may generally be performed by the computing environment 100 of FIG. 1, such as by server 110.

Operation 602 includes interpreting, using a first language processing machine learning model, the electronic document to obtain interpreted data about the electronic document. For instance.

Operation 604 includes selecting, based on the current request, a subset of feedback data included in a first knowledge store configured to store feedback data for prior responses to prior requests for information about the electronic document or a different electronic document;

Operation 606 includes selecting, based on the current request, a subset of domain data stored in a second knowledge store configured to store domain data associated with the particular domain of knowledge.

Operation 608 includes injecting a prompt into (e.g., providing the prompt as input to) the first language processing machine learning model or a second language processing model, the prompt based on the current request, the subset of feedback data, the subset of domain data, and the interpreted data.

Operation 610 includes generating, via the first language processing machine learning model or the second language processing machine learning model, the response to the request based on the injecting.

In certain embodiments, the operations 600 may include receiving feedback data on the response. The operations may further include storing the feedback data in the first knowledge store. For instance, in some embodiments, the first knowledge store may include a vector store and storing the feedback data in the vector store may include generating, via an embedding model, an embedding of the feedback data and storing the embedding in the vector store.

In certain embodiments, the operations 600 may include training the first language processing machine learning model or the second language processing machine learning model based on the feedback data on the response. For instance, in some embodiments, training may occur in response to receiving a subsequent request for information about the electronic document (or a different electronic document) and may include determining, based on the subsequent request, that the feedback data on the response to the current request is relevant. The training may further include selecting, based on the subsequent request, the feedback data on the response to the current request and injecting a subsequent prompt into the first language processing machine learning model or the second language processing machine learning model based on the feedback data on the response to the current request.

Example Computing Systems

Figures 7A, 7B:
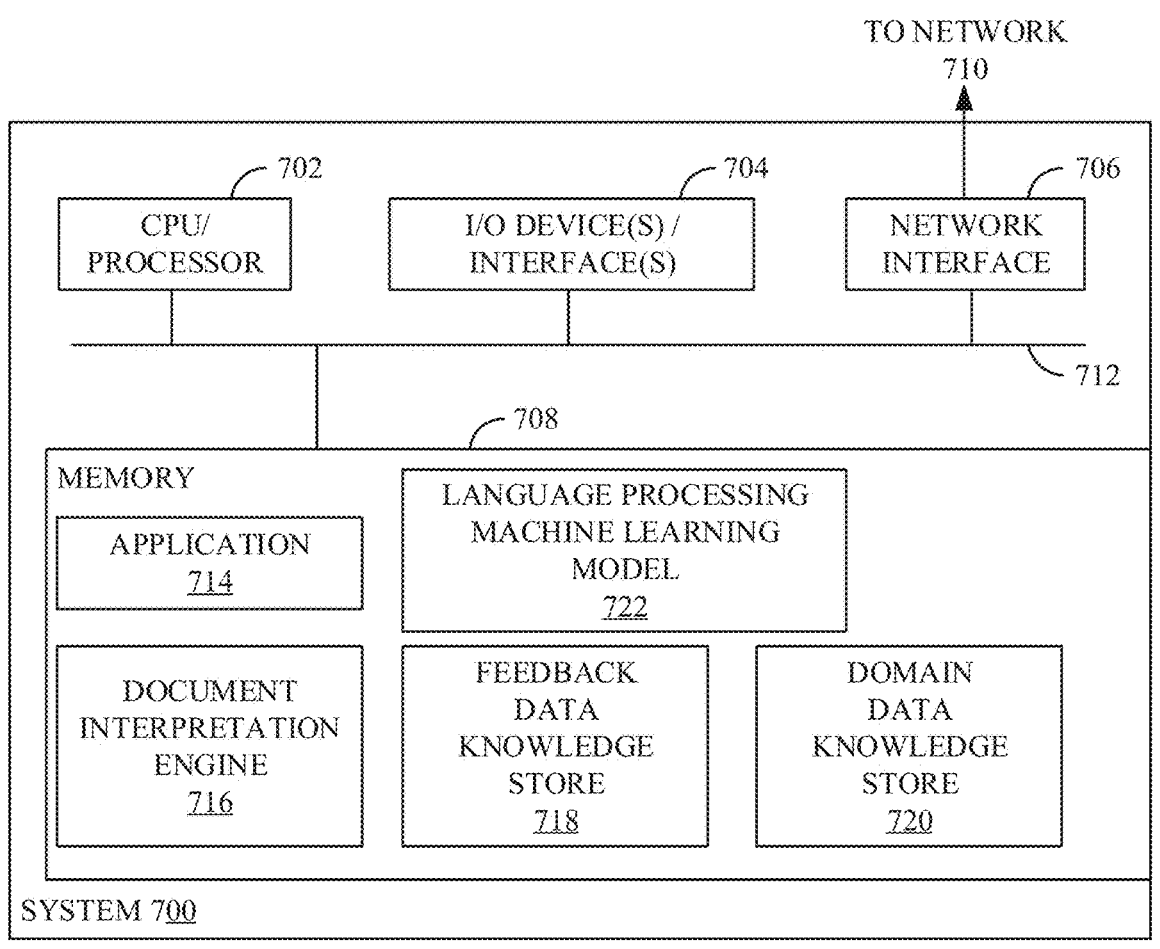
FIGS. 7A and 7B depict example processing systems according to some embodiments of the present disclosure.

FIG. 7A illustrates an example computing system 700 with which embodiments of the disclosure related to evaluating context-specific content generated by a generative artificial intelligence model may be implemented. For example, the computing system 700 may be representative of the server 110 of FIG. 1.

The computing system 700 includes a central processing unit (CPU) 702, one or more I/O device interfaces 704 that may allow for the connection of various I/O devices 704 (e.g., keyboards, displays, mouse devices, pen input, etc.) to the computing system 700, a network interface 706, a memory 708, and an interconnect 712. It is contemplated that one or more components of the computing system 700 may be located remotely and accessed via a network 710. It is further contemplated that one or more components of the computing system 700 may include physical components or virtualized components.

The CPU 702 may retrieve and execute programming instructions stored in the memory 708. Similarly, the CPU 702 may retrieve and store application data residing in the memory 708. The interconnect 712 transmits programming instructions and application data, among the CPU 702, the I/O device interface 704, the network interface 706, the memory 708. The CPU 702 is included to be representative of a single CPU, multiple CPUs, a single CPU having multiple processing cores, and other arrangements.

Additionally, the memory 708 is included to be representative of a random access memory or the like. In some embodiments, the memory 708 may include a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, the memory 708 includes an application 714, a document interpretation engine 716, a feedback data knowledge store 718, a domain data knowledge store 720, and a language processing machine learning model 722, which may be representative of the software application 140, document interpretation engine 162, the feedback data knowledge store 164 and the domain data knowledge store 166 of FIG. 1 as well as the language processing machine learning model 208 of FIGS. 2A and 2B.

FIG. 7B illustrates an example computing system 750 with which embodiments of the disclosure related to evaluating context-specific content generated by a generative artificial intelligence model may be implemented. For example, the computing system 750 may be representative of the client device 120 of FIG. 1.

The computing system 750 includes a central processing unit (CPU) 772, one or more I/O device interfaces 574 that may allow for the connection of various I/O devices 774 (e.g., keyboards, displays, mouse devices, pen input, etc.) to the computing system 750, a network interface 776, a memory 758, and an interconnect 760. It is contemplated that one or more components of the computing system 750 may be located remotely and accessed via the network 710. It is further contemplated that one or more components of the computing system 750 may include physical components or virtualized components.

The CPU 762 may retrieve and execute programming instructions stored in the memory 758. Similarly, the CPU 772 may retrieve and store application data residing in the memory 758. The interconnect 760 transmits programming instructions and application data, among the CPU 772, the I/O device interface 774, the network interface 776, the memory 758. The CPU 772 is included to be representative of a single CPU, multiple CPUs, a single CPU having multiple processing cores, and other arrangements.

Additionally, the memory 758 is included to be representative of a random access memory or the like. In some embodiments, the memory 758 may include a disk drive, solid state drive, or a collection of storage devices distributed across multiple storage systems. Although shown as a single unit, the memory 758 may be a combination of fixed and/or removable storage devices, such as fixed disc drives, removable memory cards or optical storage, network attached storage (NAS), or a storage area-network (SAN).

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automatically generating a response to a current request for information about an electronic document associated with a particular domain of knowledge and prepared using a software application, comprising:

interpreting, using a first language processing machine learning model, the electronic document to obtain interpreted data about the electronic document;

selecting, based on the current request, a subset of feedback data included in a first knowledge store configured to store feedback data for prior responses to prior requests for information about the electronic document or a different electronic document;

selecting, based on the current request, a subset of domain data stored in a second knowledge store configured to store domain data associated with the particular domain of knowledge;

injecting a prompt into the first language processing machine learning model or a second language processing machine learning model, the prompt based on the current request, the subset of feedback data, the subset of domain data, and the interpreted data; and generating, via the first language processing machine learning model or the second language processing machine learning model, the response to the current request based on the injecting.

2. The method of claim 1, further comprising:
receiving feedback data on the response; and
storing the feedback data in the first knowledge store.

3. The method of claim 2, wherein:
the first knowledge store comprises a vector store; and
storing the feedback data in the vector store includes:
generating, via an embedding model, an embedding of the feedback data; and
storing the embedding in the vector store.

4. The method of claim 2, further comprising:
training the first language processing machine learning model or the second language processing machine learning model based on the feedback data on the response.

5. The method of claim 4, wherein the training comprises:
receiving a subsequent request for information about the electronic document or a different electronic document;
determining, based on the subsequent request, that the feedback data on the response to the current request is relevant;
selecting, based on the subsequent request, the feedback data on the response to the current request; and
injecting a subsequent prompt into the first language processing machine learning model or the second language processing machine learning model based on the feedback data on the response to the current request.

6. The method of claim 1, wherein:
the second knowledge store comprises a vector store; and
the domain data stored in the vector store comprises a plurality of embeddings, each of the embeddings corresponding to a different document or rule associated with the particular domain of knowledge.

7. The method of claim 1, further comprising:
displaying the response to the current request for information about the electronic document on a display screen of an electronic device from which the current request originated.

8. The method of claim 1, wherein the injecting comprises providing the prompt as input to the first language processing machine learning model.

9. The method of claim 1, wherein:
the injecting comprises providing the prompt as input to the second language processing machine learning model; and
the second language processing machine learning model comprises a large language model.

10. A system for automatically generating a response to a current request for information about an electronic document associated with a particular domain of knowledge and prepared using a software application, the system comprising:

a memory including computer executable instructions; and a processing configured to execute the computer executable instructions and cause the system to:

interpret, using a first language processing machine learning model, the electronic document to obtain interpreted data about the electronic document;

select, based on the current request, a subset of feedback data included in a first knowledge store configured to store feedback data for prior responses to prior requests for information about the electronic document or a different electronic document;

select, based on the current request, a subset of domain data stored in a second knowledge store configured to store domain data associated with the particular domain of knowledge;

inject a prompt into the first language processing machine learning model or a second language processing machine learning model, the prompt based on the current request, the subset of feedback data, the subset of domain data, and the interpreted data; and generate, via the first language processing machine learning model or the second language processing machine learning model, the response to the current request based on the injecting.

11. The system of claim 10, wherein the computer executable instructions further cause the system to:

receive feedback data on the response; and store the feedback data in the first knowledge store.

12. The system of claim 11, wherein:

the first knowledge store comprises a vector store; and to store the feedback data in the vector store, the computer executable instructions cause the system to:

generate, via an embedding model, an embedding of the feedback data; and store the embedding in the vector store.

13. The system of claim 11, wherein the computer executable instructions further cause the system to:

train the first language processing machine learning model or the second language processing machine learning model based on the feedback data on the response.

14. The system of claim 13, wherein to train the first language processing machine learning model or the second language processing machine learning model, the computer executable instructions further cause the system to:

receive a subsequent request for information about the electronic document or a different electronic document;

determine, based on the subsequent request, that the feedback data on the response to the current request is relevant;

select, based on the subsequent request, the feedback data on the response to the current request; and inject a subsequent prompt into the first language processing machine learning model or the second language processing machine learning model based on the feedback data on the response to the current request.

15. The system of claim 10, wherein:

the second knowledge store comprises a vector store; and the domain data stored in the vector store comprises a plurality of embeddings, each of the embeddings corresponding to a different document or rule associated with the particular domain of knowledge.

16. The system of claim 10, wherein the computer executable instructions further cause the system to:

display the response to the current request for information about the electronic document on a display screen of an electronic device from which the current request originated.

17. The system of claim 10, wherein to inject the prompt into the first language processing machine learning model, the computer executable instructions cause the system to provide the prompt as input to the first language processing machine learning model.

18. The system of claim 10, wherein to inject the prompt into the second language processing machine learning model, the computer executable instructions cause the system to provide the prompt as input to the second language processing machine learning model.

19. The system of claim 18, wherein the second language processing machine learning model comprises a large language model.

20. A non-transitory computer-readable medium comprising instructions to be executed in a processing system to automatically generate a response to a current request for information about an electronic document associated with a particular domain of knowledge and prepared using a software application, wherein the instructions, when executed, cause the processing system to perform a method comprising:

interpreting, using a first language processing machine learning model, the electronic document to obtain interpreted data about the electronic document;

selecting, based on the current request, a subset of feedback data included in a first knowledge store configured to store feedback data for prior responses to prior requests for information about the electronic document or a different electronic document;

selecting, based on the current request, a subset of domain data stored in a second knowledge store configured to store domain data associated with the particular domain of knowledge;

injecting a prompt into the first language processing machine learning model or a second language processing machine learning model, the prompt based on the current request, the subset of feedback data, the subset of domain data, and the interpreted data; and generating, via the first language processing machine learning model or the second language processing machine learning model, the response to the current request based on the injecting.

\* \* \* \* \*